(12) United States Patent
Alzner et al.

(10) Patent No.: US 6,778,776 B2
(45) Date of Patent: Aug. 17, 2004

(54) PHOTO-STIMULABLE IMAGE PLATE RESTORATION APPARATUS

(75) Inventors: Edgar Alzner, Garden City, NY (US); Eddy Paultre, West Hempstead, NY (US)

(73) Assignee: Air Techniques, Inc., Hicksville, NY (US)

( * ) Notice: Subject to any disclaimer, the term of this patent is extended or adjusted under 35 U.S.C. 154(b) by 0 days.

(21) Appl. No.: 10/347,612

(22) Filed: Jan. 21, 2003

(65) Prior Publication Data

US 2003/0152383 A1 Aug. 14, 2003

Related U.S. Application Data

(60) Provisional application No. 60/354,464, filed on Feb. 5, 2002.

(51) Int. Cl.[7] .............................................. G03B 17/00
(52) U.S. Cl. .......................... 396/429; 396/661; 362/33
(58) Field of Search ................................. 396/429, 661; 362/33

(56) References Cited

U.S. PATENT DOCUMENTS

| 4,207,979 A | * | 6/1980 | Brown ........................ 206/456 |
| 4,824,190 A | * | 4/1989 | Bartlett et al. ........... 312/138.1 |
| 5,469,205 A | * | 11/1995 | Boeve et al. ................ 347/263 |

* cited by examiner

Primary Examiner—David M. Gray
(74) Attorney, Agent, or Firm—Clifford G. Frayne; Louis E. Marn

(57) ABSTRACT

There is disclosed a photo-stimulable imaging film restoration apparatus comprised of a housing defining a chamber for a light source and having an opening for a translucent plate member having a front surface including a member for positioning proximate the plate member imaging film for restoration and facile removal by grasping side portions of an imaging film.

3 Claims, 1 Drawing Sheet

PHOTO-STIMULABLE IMAGE PLATE RESTORATION APPARATUS

RELATED APPLICATIONS

Applicant claims the benefit of provisional application Ser. No. 60/354,464 filed Feb. 5, 2002.

BACKGROUND OF THE INVENTION

1. Field of the Invention

This invention relates to digital medical and/or dental imaging systems utilizing reusable photo-stimulable phosphor imaging plates (PSP), and more particularly, to an apparatus for restoring image capabilities to photo-stimulable phosphor imaging plates.

2. Description of the Prior Art

A photo-stimulable phosphor imaging plate (PSP) records an image by x-ray radiation. An exposed imaging plate is thereafter scanned or read by a scanner digitally storing the image in a computer processing unit. Since an imaging plate is reusable, residual latent image must be removed from such imaging plate prior to reuse, which is essentially a release or discharge of trapped electrons. There are automatic imaging systems wherein imaging plates are not manually handled and integrally perform such release or discharge function.

There are many imaging systems which require manual handling of imaging plates associated with dental scanners or image readers. In such imaging systems, the user exposes an imaging plate to a light source of a known power for a time sufficient at a total energy per unit area adequate to release or discharge trapped electrons of a previous latent image, preferably of at least about 95.5 percent in order to minimize or eliminate a ghost image which might remain from the previous exposure.

Existing technology associated with manual handling of imaging plates recommends the placing of imaging plates face down on a horizontal surface of a view box or clipped to a vertical surface of a wall mounted view box; a view box is used for viewing x-ray films. The lowest measured light intensity at any given point on the view box determines the amount of time required to release or discharge trapped electrons of a previous latent images by dividing exposure requirement by such intensity.

Existing technology introduces several adverse factors which effect imaging plates. The surface of the view box may be dusty or have particulate matter adhering thereto which may adhere to the image surface of the imaging plate and thereby possibly degrading subsequent images. Further, in positioning the imaging plate on such a view box, the imaging surface of the imaging plate may be scratched leading to premature degradation. Still further, surface imperfections on the view box may cause shadows on the imaging plate thereby preventing complete release or discharge of trapped electrons of any latent image of the imaging plates at such locations. Finally, manipulation of imaging plates on such surfaces invariably cause the users to touch the imaging surface of the imaging plate with concomitant deposition of body oils and acids on the sensitive surface prematurely degrading the imaging plates useful life.

OBJECTS OF THE INVENTION

An object of the present invention is to provide an apparatus for releasing or discharging trapped electrons of a latent image from a photo-stimulable imaging plate.

Another object of the present invention is to provide an apparatus releasing or discharging trapped electrons of a latent image from a photo-stimulable imaging plate obviating concomitant problems of the prior art.

A still further object of the present invention is to provide an apparatus for releasing or discharging trapped electrons of latent images from a photo-stimulable imaging plate accommodating all sizes of intraoral imaging films.

SUMMARY OF THE INVENTION

There is disclosed a photo-stimulable imaging film restoration apparatus comprised of a housing defining a chamber for a light source and having an opening for a translucent plate member having a front surface including a member for positioning proximate the plate member imaging film for restoration and facile removal by grasping side portions of an imaging film.

BRIEF DESCRIPTION OF THE DRAWINGS

Further objects and advantages of the present invention will become more readily apparent, particularly when taken in light of the following drawings, wherein like numerals designate like parts throughout and wherein.

DETAILED DESCRIPTION OF THE INVENTION

Figure 1:
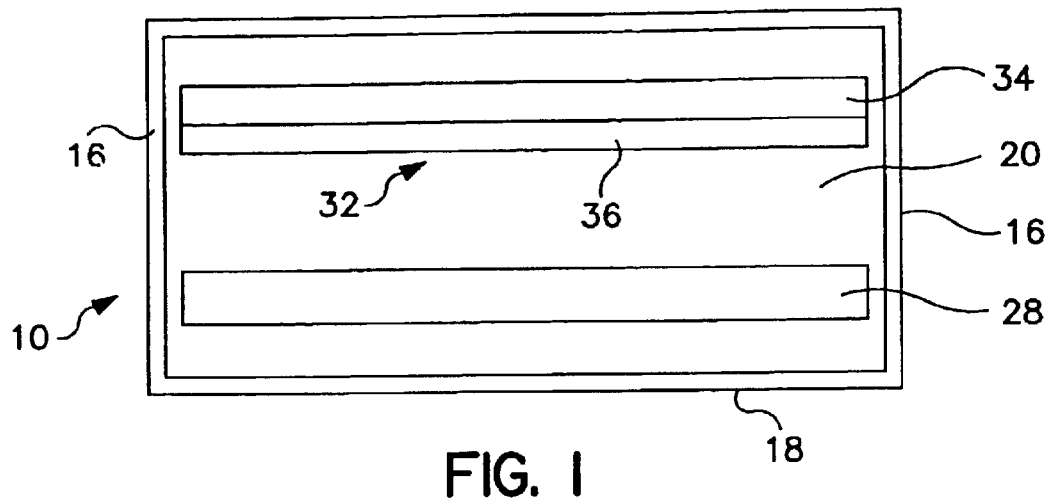
FIG. 1 is an elevational view of the restoration apparatus of the present invention.

Referring now to the drawings, there is shown a housing member, generally indicated as 10 comprised of a top wall 12, a back wall 14, side wall 16, bottom wall 18, and front panel member 20, defining a chamber 22 within which are disposed at least one light source 24, as more fully hereinafter discussed. The housing member 10 is generally rectangularly-shaped similar to the geometry of a viewing box for x-ray films as hereinabove discussed.

The front panel member 20 including front surface 26 is formed of a transparent or translucent material, such as plastic, capable of passing light or electromagnetic radiation therethrough, and is provided with a horizontally disposed, elongated bar member 28, positioned proximate the bottom wall of housing member 10 at an upwardly extending acute angle from front surface 26 of front panel member 20.

Figure 2:
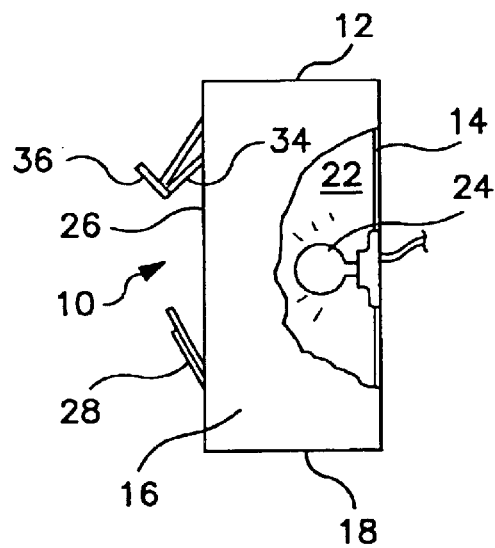
FIG. 2 is a side view of the restoration apparatus of the present invention.
Figure 3:
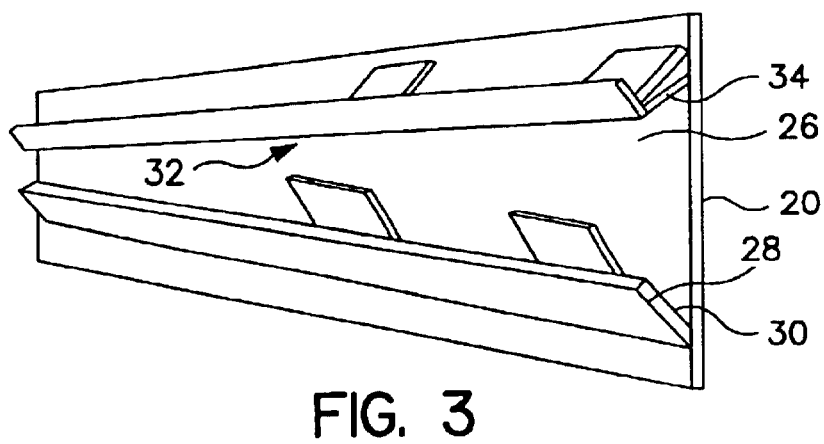
FIG. 3 is a perspective view of the restoration apparatus of the present invention illustrating the placement of imaging plates thereon.

The elongated bar member 28 is mounted to the front surface 26 of the front panel member 18 by a suitable adhesive or by electromagnetic bonding utilizing a plastic material including a particulate ferro magnetic material. The elongated bar member 28, including upper surface 30, is of a width to support an imaging plate of any size referring particularly to FIGS. 2 and 3, without possibility of overturning of an imaging plate positioned on the upper surface 30 of the bar member 28.

An elongate, horizontally disposed, L-shaped ledge member generally indicated as 32, is similarly mounted to the front surface 26 of the front panel member 20 in parallelledly relationship to the bar member 28 and above the horizontally-disposed bar member 28. The elongated L-shaped ledge member 32 is comprised of an upper leg portion 34 extending downwardly to a foot portion 36 wherein the upper leg portion 34 is mounted to the front surface 26 of the panel member 20. The length dimension of the leg portion 34 from the surface 26 is smaller than a length or width of an imaging plate to be restored whereby positioning any imaging plate results in contact thereof but displaced from the front surface 26 of the panel member 20 permitting contact with the sides of such imaging plate by fingers of the user in positioning or removal of the imaging plate on or from the L-shaped ledge member 32.

The light source 24 is preferably an array of incandescent bulbs in co-axial alignment with the bar member 28 and the L-shaped ledge member 32 to provide at least 120,000 lux seconds of light energy. As hereinafter discussed an incandescent light source provides more effective restoration at reduced time requirements.

In operation, imaging plates to be restored to image capabilities are positioned on the upper surface 30 of the bar member 28 or wedged in L-shaped shelf member 32 with subsequent activation of light source for a time sufficient to release or discharge of trapped electrons of any latent image.

It will be recognized that elongate bar member 28 and L-shaped ledge member 32 could be formed integrally with front panel member 20 or be formed with a transparent or translucent back plate so as to be affixed to an existing light box.

While the present invention has been described with respect to the exemplary embodiments thereof, it will be understood by one of ordinary skill in the art that many modifications or changes may be achieved without departing from the spirit and scope of the invention; therefore, it is manifestly intended that the invention be limited only by the scope of the claims and the equivalence thereof.

What is claimed:

1. A photo-stimulable imaging plate restoration apparatus which comprises:
    a housing member defining a chamber and having a front opening;
    a light source disposed with said chamber of said housing member;
    a translucent plate member positioned within said front opening of said housing and having a front surface; and
    means for positioning an imaging plate for restoration proximate said front surface of said translucent plate member, whereby positioning and removal of an imaging plate is achieved by gripping side portions of said imaging plate.

2. The photo-stimulable imaging plate restoration apparatus as defined in claim 1 wherein said positioning means is a translucent elongated L-shaped bar member horizontally mounted and extending downwardly from said front surface of said translucent plate member, said elongated L-shaped bar member is comprised of a downwardly depending leg portion and a foot portion upwardly depending from said leg portion, wherein a length dimension of said leg portion from said front surface of said translucent plate member is less than a width or length dimension of an imaging plate for restoration.

3. The photo-stimulable imaging plate restoration plate member as defined in claim 2 wherein said elongated L-shaped bar members is formed of a plastic material.

* * * * *